(12) United States Patent
Jaiven et al.

(10) Patent No.: US 10,364,754 B2
(45) Date of Patent: Jul. 30, 2019

(54) SYSTEMS AND METHODS FOR CONTROLLING OVERBOARD BLEED HEAT OF A TURBINE INLET FILTER

(71) Applicant: General Electric Company, Schenectady, NY (US)

(72) Inventors: Rebecca Kathryn Jaiven, Ann Arbor, MI (US); Andrew David Ogden, Atlanta, GA (US); Thomas John Freeman, Canton, GA (US)

(73) Assignee: General Electric Company, Schenectady, NY (US)

( * ) Notice: Subject to any disclaimer, the term of this patent is extended or adjusted under 35 U.S.C. 154(b) by 39 days.

(21) Appl. No.: 15/463,358

(22) Filed: Mar. 20, 2017

(65) Prior Publication Data
US 2018/0266332 A1    Sep. 20, 2018

(51) Int. Cl.
| | |
|---|---|
| *F02C 3/04* | (2006.01) |
| *F02C 3/13* | (2006.01) |
| *F02C 7/05* | (2006.01) |
| *F02C 9/18* | (2006.01) |
| *F02C 9/52* | (2006.01) |
| *G05D 7/06* | (2006.01) |
| *F01D 21/00* | (2006.01) |
| *F02C 7/042* | (2006.01) |
| *F02C 7/047* | (2006.01) |

(Continued)

(52) U.S. Cl.
CPC .............. *F02C 9/18* (2013.01); *F01D 21/003* (2013.01); *F02C 3/04* (2013.01); *F02C 3/13* (2013.01); *F02C 7/042* (2013.01); *F02C 7/047* (2013.01); *F02C 7/05* (2013.01); *F02C 9/52* (2013.01); *G05B 15/02* (2013.01); *G05D 7/0635* (2013.01); *G05D 23/1917* (2013.01); *F05D 2220/32* (2013.01); *F05D 2270/311* (2013.01); *F05D 2270/312* (2013.01); *F05D 2270/313* (2013.01); *F05D 2270/54* (2013.01)

(58) Field of Classification Search
None
See application file for complete search history.

(56) References Cited

U.S. PATENT DOCUMENTS

| | | |
|---|---|---|
| 3,925,979 A | 12/1975 | Ziegler |
| 8,844,258 B2 | 9/2014 | Ekanayake et al. |

(Continued)

FOREIGN PATENT DOCUMENTS

| | | |
|---|---|---|
| EP | 2 541 022 A2 | 1/2013 |
| GB | 673961 A | 6/1952 |

OTHER PUBLICATIONS

Extended European Search Report and Opinion issued in connection with corresponding EP Application No. 18158553.0 dated Jul. 16, 2018.

*Primary Examiner* — Ryan A Jarrett
(74) *Attorney, Agent, or Firm* — Fletcher Yoder P.C.

(57) ABSTRACT

A power generation system includes a processor and memory storing instructions that cause the processor to receive a first set of sensor data indicative of one or more ambient conditions with respect to the power generation system, determine whether one of the one or more ambient conditions is above a respective threshold, and send a signal to a valve to open when the one of the one or more ambient conditions is below the respective threshold, such that the valve is configured to fluidly couple a first fluid exiting a compressor to an inlet of the compressor.

17 Claims, 3 Drawing Sheets

(51) Int. Cl.
*G05B 15/02* (2006.01)
*G05D 23/19* (2006.01)

(56) References Cited

U.S. PATENT DOCUMENTS

| | | | |
|---|---|---|---|
| 2010/0107594 A1 | 5/2010 | Coffinberry et al. | |
| 2013/0340439 A1* | 12/2013 | Ekanayake | F02C 7/047 60/779 |
| 2014/0144124 A1* | 5/2014 | Mazumder | F02C 7/047 60/39.093 |
| 2015/0345393 A1* | 12/2015 | Ekanayake | F02C 7/08 60/782 |
| 2017/0051668 A1* | 2/2017 | Kraft | F02C 7/047 |

* cited by examiner

SYSTEMS AND METHODS FOR CONTROLLING OVERBOARD BLEED HEAT OF A TURBINE INLET FILTER

The subject matter disclosed herein relates to turbomachinery, and more particularly, to controlling the overboard bleed heat of a turbine inlet filter for gas turbines.

In power generation systems, turbines, such as gas turbines or steam turbines, may convert fuel and air (e.g., an oxidant) into rotational energy. For example, a gas turbine may compress air, via a compressor, and mix the compressed air with fuel to form an air-fuel mixture. A combustor of the gas turbine may then combust the air-fuel mixture and use energy from the combustion process to rotate one or more rows of turbine blades, thereby generating rotational energy. The rotational energy may then be converted into electricity, via a generator, to be provided to a power grid, a vehicle, or another load.

In some instances, the aforementioned components of power generation system may operate in various environments (e.g., cold environments), such that the components of the power generation system may freeze, become clogged, or malfunction when receiving ambient air. To ensure that the power generation system operates efficiently in various environments, improved systems and methods for operating the power generation system in these environments will be useful.

BRIEF DESCRIPTION

Certain embodiments commensurate in scope with the original claims are summarized below. These embodiments are not intended to limit the scope of the claims, but rather these embodiments are intended only to provide a brief summary of possible forms of the embodiments disclosed herein. Indeed, the disclosed embodiments may encompass a variety of forms that may be similar to or different from the embodiments set forth below.

In a first embodiment, a power generation system includes a processor and memory storing instructions that cause the processor to receive a first set of sensor data indicative of one or more ambient conditions with respect to the power generation system, determine whether one of the one or more ambient conditions is above a respective threshold, and send a signal to a valve to open when the one of the one or more ambient conditions is below the respective threshold, such that the valve is configured to fluidly couple a first fluid exiting a compressor to an inlet of the compressor.

In a second embodiment, a tangible, non-transitory, and computer-readable medium storing instructions thereon that are executed by one or more processors, such that the instructions, when executed, cause the one or more processors to receive a first set of sensor data indicative of one or more ambient conditions with respect to a power generation system, determine whether one of the one or more ambient conditions is above a respective threshold, and send a signal to a valve to open when the one of the one or more ambient conditions is below the respective threshold, such that the valve is configured to fluidly couple a first fluid exiting a compressor to an inlet of the compressor.

In a third embodiment, a method includes receiving, via a processor, a first set of sensor data indicative of one or more ambient conditions with respect to a power generation system. Furthermore, the method includes determining, via the processor, whether one of the one or more ambient conditions is above a respective threshold, and sending, via the processor, a signal to a valve to open when the one of the one or more ambient conditions is below the respective threshold, such that the valve is configured to fluidly couple a first fluid exiting a compressor to an inlet of the compressor.

BRIEF DESCRIPTION OF THE DRAWINGS

These and other features, aspects, and advantages of the presently disclosed embodiments will become better understood when the following detailed description is read with reference to the accompanying drawings in which like characters represent like parts throughout the drawings, wherein.

DETAILED DESCRIPTION

Figure 1:
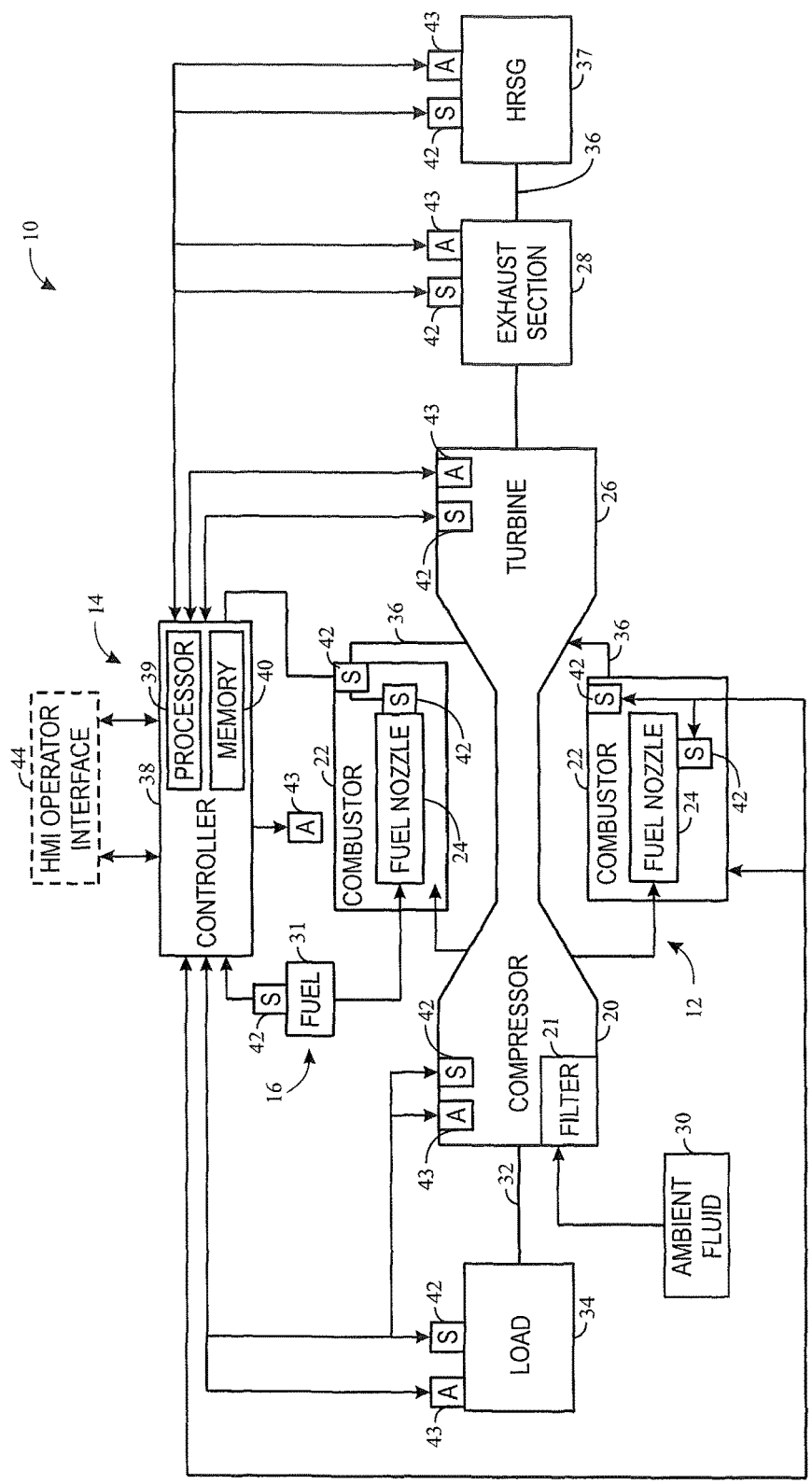
FIG. 1 is block diagram of a power generation system and a controller that controls one or more output parameters of the power generation system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Power generation systems may operate in various environments, where ambient conditions may vary widely in temperature, humidity, and the like. In certain cases, when ambient conditions are above or below a threshold, the efficiency and longevity of the power generation system may be compromised. For example, the power generation system may operate in an environment with an ambient temperature that is below an ambient temperature threshold. In certain cases, the ambient air, having a temperature below the ambient temperature threshold may cause ice to build up at an inlet of a compressor of a power generation system or forward portion of the gas turbine compressor. Furthermore, in some instances, the ambient air may cause damage to various components of the power generation system, involve more frequent maintenance, negatively impact the efficiency of the system, and/or result in other negative outcomes.

In certain climate conditions, it is possible for water to fall out on the compressor inlet (e.g., via a water source) resulting in ice buildup. In some instances, it is also possible that components of the power generation system (e.g., cooling towers) produce a water source that add to the water accumulation at the compressor inlet. As ice builds on the inlet, it may restrict the flow capacity of the inlet and effectively prevent a suitable amount air from entering the compressor. The subject matter discussed below deals with systems and methods that, in some instances, may prevent the aforementioned ice buildup.

To ensure that the power generation system will operate efficiently in a variety of ambient conditions of certain environments, exhaust air (e.g., composition of the emissions, exhaust gas temperature, etc.) produced by the power generation system may be redirected to an air inlet location. As such, various ambient air conditions may be compensated using the exhaust air, thereby preventing unfavorable conditions (e.g., such as freezing) at the compressor inlet may increase the longevity of some components of the power generation system. If a cause-and-effect relationship between inputs, such as ambient air inlet temperature and humidity, and outputs, such as the gas turbine emissions, power output, and outlet gas temperature, of the power generation system is established, inputs may be manipulated to modify the outputs.

Moreover, for certain power generation systems a model may be developed, such that the model establishes a relationship between the inputs and outputs. In some instances, the inputs may be adjusted to modify (e.g., control) the outputs of the power generation system. For example, for a power generation system that includes a compressor and gas turbine, there may exist a relationship between the inlet conditions for the fluid entering the compressor and the outlet parameters of the gas turbine. The inlet conditions may include the temperature and humidity of the fluid entering the compressor, and the outlet parameters of the gas turbine may include the emissions, the gas outlet temperature, and the power output of the gas turbine. In some instances, by modifying the inlet conditions of the compressor, the outlet parameters of the gas turbine may be controlled.

With the foregoing in mind, it may be useful to describe an embodiment of a power generation system 10 that may incorporate the techniques described herein, for example, to improve longevity of the component(s) of the power generating system. As illustrated, FIG. 1 illustrates an example of a power generation system 10 that includes a gas turbine system 12, a monitoring and control system 14, and a fuel supply system 16. The gas turbine system 12 may include a compressor 20, combustion systems 22, fuel nozzles 24, a gas turbine 26, and an exhaust section 28. During operation, the gas turbine system 12 may pull ambient fluid 30 (e.g., air) into the compressor 20. At the inlet of the compressor 20, a filter 21 may be positioned to treat and receive ambient fluid 30, as discussed in detail below. Further, the filter 21 may direct the flow of the ambient fluid 30 to the compressor 20. Moreover, upon receiving the ambient fluid 30, the compressor may then compress the ambient fluid 30 and move the ambient fluid 30 to the combustion system 22 (e.g., which may include a number of combustors). In the combustion system 22, the fuel nozzle 24 (or a number of fuel nozzles 24) may inject fuel that mixes with the compressed ambient fluid 30 to create, for example, an air-fuel mixture.

The air-fuel mixture may combust in the combustion system 22 to generate hot combustion gases, which flow downstream into the turbine 26 to drive one or more turbine stages. For example, the combustion gases may move through the turbine 26 to drive one or more stages of turbine blades, which may in turn drive rotation of a shaft 32. The shaft 32 may connect to a load 34, such as a generator that uses the torque of the shaft 32 to produce electricity. After passing through the turbine 26, the hot combustion gases may vent as exhaust gases 36 into the environment by way of the exhaust section 28. The exhaust gas 36 may include gases such as carbon dioxide ($CO_2$), carbon monoxide (CO), nitrogen oxides ($NO_x$), and so forth.

The exhaust gas 36 may include thermal energy, and the thermal energy may be recovered by a heat recovery steam generation system (HRSG) 37. In combined cycle systems, such as the power generation system 10, hot exhaust 36 may flow from the gas turbine 26 and pass to the HRSG 37, where it may be used to generate high-pressure, high-temperature steam. The steam produced by the HRSG 37 may then be passed through a steam turbine engine for further power generation. In addition, the produced steam may also be supplied to any other processes where steam may be used, such as to a gasifier used to combust the fuel 31 to produce the untreated syngas. The gas turbine engine generation cycle is often referred to as the "topping cycle," whereas the steam turbine engine generation cycle is often referred to as the "bottoming cycle." Combining these two cycles may lead to greater efficiencies in both cycles. In particular, exhaust heat from the topping cycle may be captured and used to generate steam for use in the bottoming cycle.

In certain embodiments, the system 10 may also include a controller 38. The controller 38 may be communicatively coupled to a number of sensors 42, a human machine interface (HMI) operator interface 44, and one or more actuators 43 suitable for controlling components of the system 10. The actuators 43 may include valves, switches, positioners, pumps, and the like, suitable for controlling the various components of the system 10. The controller 38 may receive data from the sensors 42, and may be used to control the compressor 20, the combustors 22, the turbine 26, the exhaust section 28, the load 34, the HRSG 37, and so forth.

In certain embodiments, the HMI operator interface 44 may be executable by one or more computer systems of the system 10. A plant operator may interface with the power generation system 10 via the HMI operator interface 44. Accordingly, the HMI operator interface 44 may include various input and output devices (e.g., mouse, keyboard, monitor, touch screen, or other suitable input and/or output device) such that the plant operator may provide commands (e.g., control and/or operational commands) to the controller 38.

The controller 38 may include a processor(s) 39 (e.g., a microprocessor(s)) that may execute software programs to perform the disclosed techniques. Moreover, the processor 39 may include multiple microprocessors, one or more "general-purpose" microprocessors, one or more special-purpose microprocessors, and/or one or more application specific integrated circuits (ASICS), or some combination thereof. For example, the processor 39 may include one or more reduced instruction set (RISC) processors. The controller 38 may include a memory device 40 that may store information such as control software, look up tables, configuration data, etc. The memory device 40 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof).

Furthermore, it should be noted that the sensors 42 illustrated on FIG. 1 may be communicatively coupled to the controller 38, such that the sensors 42 may relay real-time data (e.g., or any other suitable data) to the controller 38 for further processing and/or analysis. For example, the sensors 42 of the combustor 22, the compressor 20, the load 42, the gas turbine 26, etc., may be communicatively coupled to the controller 38. In certain embodiments, the HMI operator interface 44 may receive the processed sensor data from the controller 38 to identify malfunctions and/or anomalies within the power generation system 10. In certain embodiments, the HMI operator interface may set and facility the quality control of the control scheme discussed in detail below.

Figure 2:
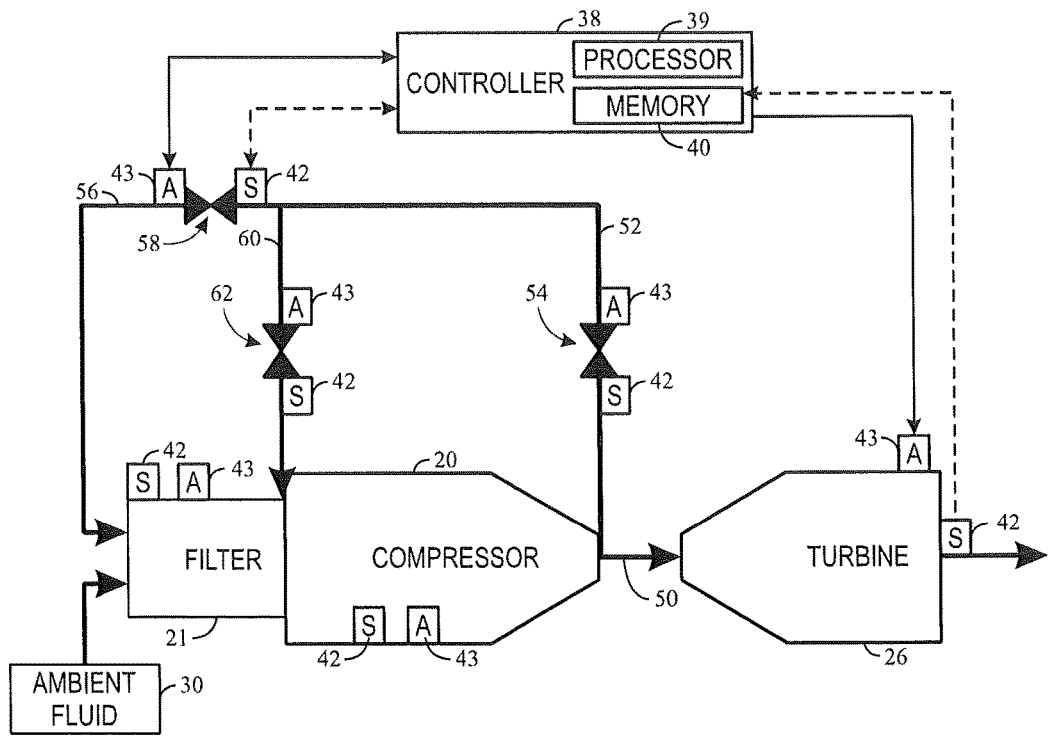
FIG. 2 is a schematic diagram of an arrangement of components of the power generation system that enables for the control of one or more of the system output parameters of the power generation system of FIG. 1, in accordance with an embodiment.

Turning to FIG. 2, the illustrated embodiment includes a schematic diagram of an arrangement of components of the power generation system that enables for the control, via controller 38, of one or more system outputs (e.g., system output parameters) of the power generation system. More specifically, the illustrated embodiment includes a compressor 20 and a filter 21 positioned at an inlet of the compressor 20. In certain embodiments, the filter 21 may be located above, abut, or anywhere near the inlet of the compressor 20. In some embodiments, the filter 21 may include a series of panels stacked on each other, such that they may remove particulates from the ambient fluid 30 traversing the filter. For example, the filter 21 may include two, four, six, or any other number of panels stacked upon each other at the entrance of the compressor 20. Furthermore, the filter 21 may include openings or airflow paths to receive fluid. For example, the filter 21 may include a first airflow path to receive ambient fluid and a second airflow path to receive fluid discharged from the compressor 20.

In some embodiments, the filter 21 may be positioned at the inlet of the compressor 20 such that the ambient fluid 30 (e.g., air) may flow through the filter 21 prior to flowing into the compressor 20. In certain embodiments, the filter 21 may include sensors 42 that receive and send data indicative of the performance and/or status of the filter 21 to the controller 38. In certain embodiments, the sensors 42 may also relay to the controller 38 data indicative of the ambient conditions around the filter 21. Furthermore, based at least in part on the sensor data, the controller 38 may actuate actuators 43 of the filter 21 to, for example, open or close openings of the filter 21 and/or control other actuators 43 of filter 21.

The illustrated embodiment includes various flow paths associated with the compressor 20 and the filter 21. First, the compressor 20 includes a first flow path 50 that directs expelled fluid (e.g., compressed air) out of the compressor 20 towards the gas turbine 26. Upon reaching the gas turbine 26, the expelled fluid may be used to drive one or more stages of the gas turbine blades, which may in turn drive rotation of a shaft 32 that may power a load 34, as mentioned above. Further, the gas turbine 26 may include one or more sensors 42 that send data (e.g., as signals) to the controller 38. The controller 38 may process the sensor data to actuate actuators 43 of the gas turbine 26 according to a control scheme. Furthermore, the controller 38 may process the sensor data to modify certain output parameters of the gas turbine 26, such as emissions, exhaust temperature, power output, etc.

In addition, the compressor 20 includes a second flow path, hereinafter referred to as the "primary bleed heat (PBH) flow path 52." The PBH flow path 52 directs fluid discharge out of the compressor 20 at a given flow rate (PBH flow rate) and a given temperature (PBH temperature). The fluid discharged out of the compressor 20 may be at a high pressure and temperature, such that fluid flowing through the PBH valve 54 may be high in temperature and/or energy. Furthermore, the PBH valve 54 regulates the flow of the fluid flowing through PBH flow path 52. The controller 38 may send signals indicative of a request to close or open the PBH valve 54 in accordance to a control scheme. In certain embodiments, the controller 38 may actuate the actuator 43 to open or close the PBH valve 54. For example, the controller 38 may send a signal indicative of a request to close the PBH valve 54, such that the controller 38 actuates the actuator 43 to cause the PBH valve 54 to close. When the PBH valve 54 is entirely closed, fluid may not flow through the PBH flow path 52, such that the PBH temperature and the PBH flow rate may be zero.

Further, compressor 20 includes a third flow path, hereinafter referred to as the "overboard bleed heat (OBB) flow path 56." The OBB flow path 56 receives fluid from the PBH flow path 52, such that the OBB flow path 56 has a given flow rate (OBB flow rate) and a given temperature (OBB temperature). As illustrated, the OBB flow path 56 directs the fluid flow into the filter 21. It should be noted that in addition to receiving fluid from the OBB flow path 56, the filter 21 may also receive ambient fluid 30. Moreover, OBB valve 58 regulates the flow of the fluid flowing through OBB flow path 56. The controller 38 may send signals indicative of a request to close or open the OBB valve 58 in accordance to a control scheme, as described in more detail below. In certain embodiments, the controller 38 may actuate the actuator 43 of the OBB valve 58 to open or close the OBB valve 58. For example, the controller 38 may send a signal indicative of a request to close the OBB valve 58, such that the controller 38 actuates the actuator 43 to cause the OBB valve 58 to close. When the OBB valve 58 is entirely closed, fluid may not flow through the OBB valve 58, such that the OBB temperature and the OBB flow rate may be zero.

Furthermore, the compressor 20 may include a fourth flow path, hereinafter referred to as the "inlet bleed heat (IBH) flow path 60." The IBH flow path 60 may receive fluid from the PBH flow path 52 at a given flow rate (IBH flow rate) and a given temperature (IBH temperature). As illustrated, the IBH flow path 60 may direct the flow of fluid from the PBH flow path 52 into the beginning of the compressor inlet after the filter 21, such that the IBH flow path 60 may cause the fluid flowing through the IBH flow path 60 to combine with fluids leaving the filter 21 (e.g., the ambient fluid 30 and the fluid from the OBB flow path 58). IBH valve 62 regulates the flow of the fluid flowing through IBH flow path 60. The controller 38 may send signals indicative of a request to close or open the IBH valve 62 in accordance to a control scheme. In certain embodiments, the controller 38 may actuate the actuator 43 to open or close the IBH valve 62. For example, the controller 38 may send a signal indicative of a request to close the IBH valve 62, such that the controller 38 actuates an actuator 43 to cause the IBH valve 62 to close. When the IBH valve 62 is entirely closed, fluid may not flow through the IBH flow path 60, such that the IBH temperature and the IBH flow rate may be zero.

Furthermore, it should be noted that in certain embodiments, the IBH flow path 60 and the IBH valve 62 may not be included. In certain embodiments, if the IBH flow path 60 and the IBH valve 62 are not included, the fluid leaving the compressor 20 along flow path 52 may be directed to flow path 56 (e.g., when the OBB valve 58 is open).

Figure 3:
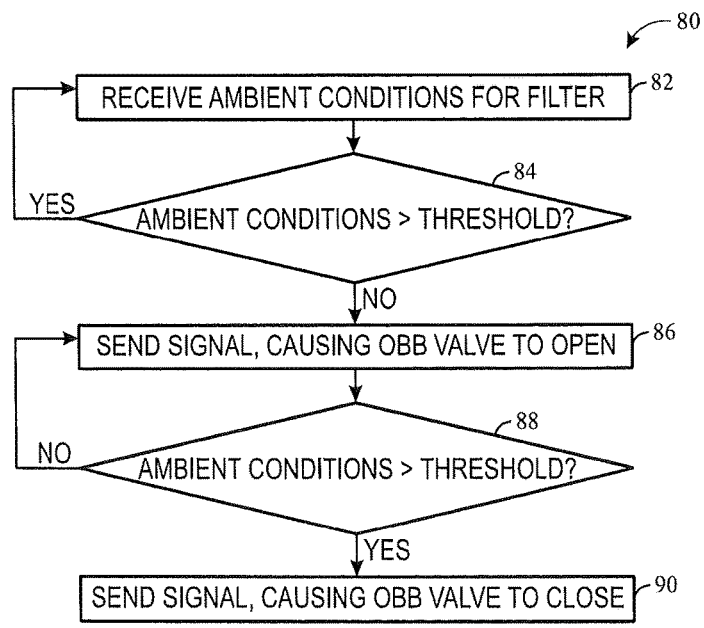
FIG. 3 is a flow diagram of a process performed by the controller for controlling one or more system outputs of the power generation system of FIG. 1 by adjusting the overboard bleed heat flow, in accordance with an embodiment.

Keeping this in mind, FIG. 3 includes an illustration of a flow diagram 80 of a process performed by the controller 38 for controlling one or more output parameters of the system (e.g., power generation system) by adjusting the overboard bleed heat (OBB) valve 58, and thereby regulating the fluid flowing through the OBB flow path 56.

In an embodiment, the controller 38 may receive data (e.g., sensor data) indicative of the ambient conditions (e.g., ambient air temperature, pressure, humidity, etc.). If the ambient conditions are less than a threshold, the OBB valve 58 may open, causing the ambient conditions to rise. Furthermore, if the controller 38 receives sensor data indicative of ambient conditions that are greater than the threshold, the controller 38 may send a signal to the OBB valve 58 that causes the OBB valve 58 to close.

Furthermore, the IBH valve 62 may be opened a certain percentage or closed a certain percentage to, for example, cycle the compressor discharged fluid flowing through PBH flow path 52 back into the compressor 20 along IBH flow path 60. For instance, the IBH valve 62 may remain open so that when the OBB valve 58 is closed, the fluid flowing through PBH flow path 52 may flow back into the compressor 20 after exiting the compressor 20 through PBH flow path 52 (e.g., because the PBH valve 54 is maintained open).

As a further example, the IBH valve 62 may remain closed, such that fluid (e.g., hot compressor discharge fluid) flowing through the PBH flow path 52 may flow along the OBB flow path 56 when the OBB valve 58 opens. In such a flow arrangement, when the OBB valve 58 is open, the fluid discharged from the compressor 20 and flowing through flow PBH flow path 52 may flow into the inlet of the filter 21 and mix with the ambient fluid 30. In certain embodiments, this mixture of fluid may have a higher temperature compared to the ambient fluid 30 and prevent the filter 21 and/or compressor 20 from freezing or becoming obstructed with frozen particles.

In more detail, the controller 38 receives, via sensors 42, data indicative of the ambient conditions for the filter 21 (block 82). The ambient conditions may include the humidity of the environment of the power generation system 10, the temperature at the filter inlet, the pressure inside the filter 21, and/or any other suitable ambient conditions that may affect the flow of the ambient fluid 30. The ambient conditions may be measured by one or more sensors 42 positioned on, abut, inside, or anywhere else on the filter 21. In certain embodiments, the one or more sensors 42 may be communicatively coupled (e.g., via wireless communication or a landline) with the controller 38. Additionally, in certain embodiments, the sensor data may be transmitted to the controller 38 in or near real-time. For example, the one or more sensors 42 of the filter 21 may obtain data of the humidity, temperature, and pressure of the environment at various locations of the power generation system and send the data to the controller 38.

In certain embodiments, the controller 38 may also receive sensor data from sensors 42 that may be located in near proximity to or on the gas turbine 26. The controller 38 may receive sensor data from the gas turbine 26 (e.g., or any other components of the power generation system 10) in conjunction with the sensor data received from the filter 21.

In certain embodiments, the sensor data received from the gas turbine 26 may be utilized by the controller 38 to verify that the gas turbine 26 is running at a suitable state. That is, the controller 38 may be programmed to take real-time or near real-time measurements of the output parameters of the gas turbine 26 and compare the real-time measurements to the calculated values for the output parameters of the gas turbine 26. In certain embodiments, the sensor data of the output parameters of the gas turbine 26 may be compared to the output parameters calculated by the controller 38 as a way to check the accuracy of the steps performed by flow diagram 80 discussed below.

After receiving the sensor data of the ambient conditions for the filter 21, the controller 38 processes the data to determine if the ambient conditions for the filter 21 are greater than threshold values (decision block 84). In more detail, there may be a threshold for the ambient conditions measured by the sensors 42 of the filter 21. In certain embodiments, there may be a respective threshold value for different ambient conditions, such as the temperature, humidity, pressure, etc. at the inlet of the filter 21. For example, the temperature threshold may be 290 degrees Kelvin, the humidity threshold may be 50% relative humidity (RH), and the pressure threshold may be 0.71 kPa.

In certain embodiments, the threshold values may be values pre-set by a plant operator (e.g., a person operating the power generation system 10) to, for example, prevent freezing at the inlet of the compressor 20. In some embodiments, the threshold values for the ambient conditions may be values automatically generated by the controller 38 based on sensor data obtained from the sensors 42 of the filter 21 and/or from the sensors obtained from the sensors 42 of the compressor 20 over time. Based on the data of the various components of the power generation system 10 (e.g., compressor 20, gas turbine 26, etc.) obtained by the sensors 42, the controller 38 may update the threshold values for the ambient conditions. For example, the controller 38 may receive a temperature measurement of the ambient fluid 30 from sensors 42 and may determine that the temperature threshold should be 290 degrees Kelvin to prevent freezing of the compressor 20. As such, the temperature threshold may be updated to 290 degrees Kelvin.

When the ambient conditions are above the threshold values, the OBB valve 58 may remain unopened and the controller 38 may continue to receive ambient conditions for the filter 21 (block 82) at a given frequency. For example, in certain embodiments, the temperature threshold may be set to 290 degrees Kelvin to prevent cold fluid (e.g., ambient fluid 30) from flowing into the inlet of the compressor 20 and freezing its internal components, thereby causing a decrease in the efficiency of the output of the gas turbine 26. In certain embodiments, the controller 38 may continue to receive data regarding the ambient conditions for the filter 21 until the ambient conditions are less than the pre-set threshold of 290 degrees Kelvin.

If the ambient temperature (e.g., or any other condition) is less than the threshold (e.g., 290 degrees Kelvin), the controller 38 may send a signal to the actuator 43 of the OBB valve 58, causing the OBB valve 58 to open (block 86). Hereinafter, when referring to opening or closing the OBB valve 58, it should be noted that opening and closing the OBB valve 58 may result in closing or opening the OBB valve 58 a certain percentage. For example, the signal the controller may send to the actuator 43, may cause the OBB valve to open 5%, 10%, 25%, 50%, 75% or any other suitable percentage. For reference, when the OBB valve 58 is 0% open, the OBB valve 58 is completely closed. When the OBB valve 58 is 100% open, the OBB valve is completely open. In some embodiments, closing and/or opening the valve may include opening and/or closing a portion of an aperture associated with the valve.

Opening the OBB valve 58 may result in fluid flowing through the OBB valve 58 along OBB flow path 56 to the inlet of the filter 21. As mentioned above, because the fluid discharged out of the compressor 20 may be high in temperature and because the PBH valve 54 may be open, in certain embodiments, opening the OBB valve 58 may cause hot fluid (e.g., from the compressor 20) to mix with the ambient fluid 30. In some embodiments, this mixing of fluid may prevent the compressor 20 from freezing, thereby preventing damage to the components of the power generation system 10 and possibly preventing a decrease in the efficiency of the gas turbine 26.

After sending a signal to cause the OBB valve 58 to open (e.g., when the ambient conditions are great or less than respective threshold quantities), the controller 38 may again determine whether the ambient conditions are greater than their respective threshold quantities (block 88). That is, in certain embodiments, the controller 38 may take measurements of the ambient temperature according to a timing scheme. For example, the controller 38 may receive data measurements from the sensors 42 every 100 milliseconds, every second, every four seconds, every minute, or at any other suitable frequency. In certain embodiments, after receiving data measurements indicative of the ambient temperature the controller 38 may proceed to determine if the ambient temperature (e.g., or any other ambient conditions) is greater than its threshold (blocks 84 and 88).

After the OBB valve 58 has been opened, and if the ambient condition(s) are still less than their threshold(s), the controller may send a signal to cause the OBB valve 58 to open more (block 86). As mentioned above, in certain embodiments, the OBB valve 58 may open the ambient temperature is less than its threshold.

On the other hand, in certain embodiments, if the ambient conditions are greater than the respective thresholds, the controller 38 may send a signal to the OBB valve 58, causing the OBB valve 58 to close (block 90). To continue the aforementioned example, if the ambient temperature (e.g., and other ambient conditions) measurement taken at the filter 21 inlet is greater than its threshold, the controller 38 may send a signal to the OBB valve 58, such that the signal causes the OBB valve 58 to close a certain percent. For example, the controller 38 may be programmed to have a temperature threshold of 290 Kelvin. Since the fluid flowing through OBB flow path 56 may be hot, increasing the flow of fluid through OBB flow path 56 may increase the temperature of the fluid flowing into the filter 21 (e.g., which may be ambient fluid 30 and fluid through OBB flow path 56). As such, sending a signal to close the OBB valve 58 may cause the temperature of the fluid entering the compressor 20 (or filter 21) to be lowered so that they may be closer to its respective threshold.

It should be noted that in some embodiments, the flow diagram 80 may be applied to ambient conditions other than temperature, such as the humidity of the ambient fluid 30 or any other conditions of the ambient fluid 30. Furthermore, the logic of flow diagram 80 may also be implemented to instead open the OBB valve 58 when the ambient condition is greater than the threshold value and close the OBB valve 58 when the ambient condition is less than the threshold value. In addition, some embodiments may apply flow diagram 80 to more than one ambient condition (e.g., temperature, humidity, etc.) to ensure that the more than one ambient conditions are greater than or below their respective threshold values.

With the aforementioned flow diagram 80 in mind, a mathematical model for establishing a relationship between inputs to the power generation system 10 and outputs of the power generation system 10. The flow rate for compressor inlet may be defined as:

$$\dot{m}_{comp} = \dot{m}_{amb} + \dot{m}_{obb} + \dot{m}_{PBH} + \dot{m}_{leak}, \quad (1)$$

where $\dot{m}_{comp}$ is the flow rate of the compressor inlet, $\dot{m}_{amb}$ is the flow rate of the ambient fluid 30, $\dot{m}_{obb}$ is the flow rate of the fluid flowing through the OBB flow path 56, $\dot{m}_{PBH}$ is the flow rate of the fluid flowing through the PBH flow path 52, and $\dot{m}_{leak}$ is the flow rate of any leakages out of the system.

The enthalpy flow rate may be defined as:

$$H = \dot{m}h, \quad (2)$$

where H is the enthalpy flow rate, $\dot{m}$ is the mass flow rate (e.g., which may refer to any of the variables of equation 1), and h is the specific enthalpy.

It should be noted that the specific enthalpy is a function of both the pressure and temperature of the fluid. With these relationships in mind, a mathematical model may be developed as follows:

$$(E_{emissions}, E_{temp}, E_{power}) = f(\dot{m}_{obb}), \quad (3)$$

where $E_{emissions}$ is the emissions content (e.g., of nitrogen oxide (NOx)) from the gas turbine 26, $E_{temp}$ is the temperature of the exhaust gas from the gas turbine 26, and $E_{power}$ is the power output of the gas turbine 26. These output parameters from the gas turbine are a function of the mass flow rate of the fluid flowing through the OBB flow path 56. Therefore, adjusting the flow of fluid through the OBB flow path 56 may allow for control of the output parameters of the gas turbine.

Furthermore, in some embodiments, the mathematic model may be governed by principles such as the Brayton Cycle. The mathematic model may reflect that any modification to the OBB valve 58 (e.g., closing or opening by any percent) will result in a measurable change in the exhaust temperature and power output if no other mitigating control factors occur. That is, in a steady state system, any change in the OBB valve 58 and no other automatic compensation for variation (e.g., such that the model does not adjust for changes in the OBB valve 58), may result in a corresponding change (e.g., reduction) in exhaust temperature and power output. The correlation between how much the modification to the OBB valve 58 impacts the system output parameters may depend on the size of the valve, among other factors the mathematic model may account for.

In certain embodiments, in addition to applying flow diagram 80 to regulate the ambient conditions (e.g., temperature, humidity, etc.), the process of flow diagram 80 may also be applied to control the output parameters of the gas turbine 26, based at least on the above mentioned mathematic model. That is, causing the OBB valve 58 to open a certain amount may cause a certain amount of flow through the OBB valve 58. In certain embodiments, the controller 38 may calculate and control the output parameters of the gas turbine 26 by adjusting the flow (and flow rate) through the OBB valve 58 when the other valves are kept constant (e.g., open or closed). For example, the sensor 42 may take measurements (e.g., of the flow rate) of the OBB valve 58 and the measurement may be sent to the controller 38. The controller 38 may then calculate the output parameters of the gas turbine 26, such as the exhaust temperature, the nitrogen oxide (NOx) emissions, and power output of the gas turbine 26 based on the flow rate through the OBB valve 58, as shown in equation 3. As such, the controller 38 may control the outputs of the gas turbine 26 by adjusting the flow parameters (e.g., flow rate) through the OBB valve 58 to cause the outputs of the gas turbine to remain above a threshold as discussed above with respect to maintaining the ambient conditions above a threshold.

Figure 4:
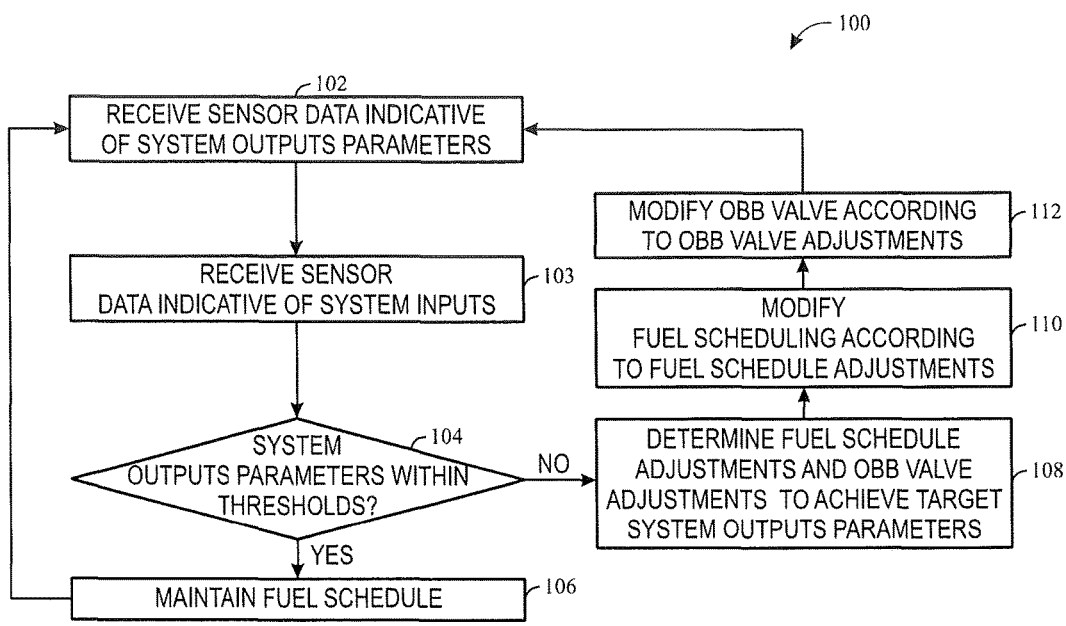
FIG. 4 is a flow diagram of a process performed by the controller of modifying a fuel schedule via closed-loop feedback to achieve target system output parameters for the power generation system of FIG. 1, in accordance with an embodiment.

Turning our attention to FIG. 4, illustrated is a flow diagram 100 of a process for modifying the fuel schedule of a gas turbine 26 to attempt to maintain system output parameters (e.g., output parameters of the gas turbine 26) within target threshold values. Flow diagram 100 may be applied to power generation systems 10 similar to those illustrated in FIGS. 1 and 2. More specifically, the flow diagram 100 may be applied to the schematic diagram of FIG. 2 when the OBB valve 58 is maintained open. That is, the process illustrated by flow diagram 100 may result in causing a change in the measurable output parameters of the gas turbine while the OBB valve 58 is maintained open. In further embodiments, it may facilitate the implementation of flow diagram 100 if the status of the valves (e.g., whether the valves are open or closed) associated with the compressor 20 and gas turbine 26 are known.

With the foregoing in mind, the flow diagram 100 includes the controller 38 receiving sensor data indicative of system inputs and system output parameters (e.g., output parameters of the gas turbine 26). The system inputs may include the flow rate through the OBB valve 58 ($\dot{m}_{obb}$), the temperature of the ambient fluid flow 30, and/or any other suitable input variables. The system output parameters may include the exhaust temperature, nitrogen oxide (NOx) emissions, etc. The controller 38 may then determine if the system output parameters are within threshold values. If the system output parameters are within the threshold values, the controller 38 may maintain its current fuel schedule to produce those system outputs. In some embodiments, when the system output parameters are within threshold values, the controller 38 may also maintain the OBB valve 58 in its current state (e.g., open or closed a certain amount). Furthermore, the controller 38 may continue to receive sensor data indicative of system output parameters.

On the other hand, if the system output parameters are not within threshold values, the controller 38 may determine adjustments to the fuel schedule and/or the OBB valve 58 to achieve target values for the system output parameters. After determining the fuel schedule adjustments, the controller 38 may modify the fuel schedule according to the fuel schedule adjustment and/or may modify the OBB valve 58 according to the OBB valve adjustments until the values of the sensor data reflect values within threshold values.

In more detail, as mentioned above, the gas turbine 26 may include sensors 42 disposed on, in, and/or abutting the gas turbine 26, such that the sensors 42 may take measurements of the various system outputs (block 102) of the gas turbine 26. For example, the gas turbine 26 may include a first sensor 42 capable of sending temperature readings indicative of the exhaust of the gas turbine 26 to the controller 38, a second sensor 42 capable of sending readings indicative of the NOx composition of the exhaust gas to the controller 38, a third sensor 42 capable of sending readings indicative of the power output of the gas turbine 26 to the controller 38, etc. Furthermore, as mentioned above the controller 38 and the sensors 42 may be communicatively coupled to one another. The controller 38 may receive 10, 100, 1000, or any suitable number of sensor readings per minute. In certain embodiments, the data measurements and the processing of the data may occur in or near real-time.

Furthermore, the gas turbine may include sensors 42 that may take measurements of the various system inputs (block 103) of the gas turbine 26. For example, the gas turbine 26 may include a sensor 42 capable of sending temperature readings indicative of the temperature of the inlet of the compressor 20 to the controller 38, another sensor 42 capable of sending readings indicative of flow rate through the OBB valve 58 to the controller 38, another sensor 42 capable of sending readings indicative of the properties (e.g., enthalpy, temperature, pressure, etc.) of the fluid entering the compressor 20, etc.

After receiving a sensor reading and determining the system inputs and the system output parameters (e.g., the aforementioned output parameters of the gas turbine), the controller 38 may determine whether the system output parameters are within threshold values (decision block 104). In certain embodiments, the measured system output parameters may have respective threshold values, such as an acceptable upper threshold and an acceptable lower threshold. Any values within the lower threshold and the upper threshold may be identified as a target (e.g., acceptable) value for the system output parameter. For example, with regards to the system output parameter of NOx emission, the controller 38 define a lower threshold of seven NOx and an upper threshold of ten NOx.

In some instances, the measurements of the various system inputs, such as the flow rate through the OBB valve 58, may be used by the controller 38 to determine the system outputs discussed above. That is, based on the mathematical models above, the flow rate through the OBB valve 58 along with other sensor reading regarding various input parameters, the controller 38 may determine the system outputs at a given time or over a period of time. In this way, the controller 38, in some embodiments, may determine whether the calculated system outputs are within acceptable threshold ranges without sensing the system outputs.

In certain embodiments, the threshold values may be pre-set by a plant operator (e.g., person who services the power generating system). For example, the controller 38 may be programmed to automatically define target NOx emission output thresholds between the values of seven and ten. In a similar manner, in some embodiments, the other system outputs may also include upper and lower values for thresholds, such that values (e.g., sensor data indicative of the system outputs) falling outside of the thresholds may be identified as not acceptable.

After identifying the system output parameters and determining whether the system output parameters (e.g., gas turbine outputs) are within their respective threshold values, if the system output parameters are within the thresholds, the controller 38 maintains the current fuel schedule (block diagram 106) of the gas turbine 26. In some embodiments, the fuel schedule of the gas turbine 26 may include the gas turbine temperature, the combustion firing temperature, the individual flow of fuel through the nozzles of the gas turbine 26, etc. It should be noted, that the system output parameters (e.g., outputs of the gas turbine 26) are due, based in part, to the fuel schedule of the gas turbine 26. Therefore, in certain embodiments, when the data received by the sensors of the gas turbine 26 indicate that the system output parameters are within their respective thresholds, maintaining the fuel schedule may maintain system output parameters within their respective thresholds. That is, when the data received by the sensors 42 of the gas turbine 26 indicate that the system output parameters are within their respective thresholds, maintaining the fuel schedule may maintain the values of the system output parameter as acceptable (e.g., target values).

In certain embodiments, when the fuel schedule is maintained (e.g., remained unchanged), the measurable system output parameters may remain within their respective thresholds. For example, the controller 38 may receive sensor data indicative of a system output parameter, such as the NOx emission output (e.g., or any other system output parameter). Furthermore, if the aforementioned system output parameter is within its threshold values, the fuel schedule is maintained. For example, if the controller 38 defines an upper threshold value often NOx and a lower threshold value of seven NOx, and the controller receives sensor data indicative of an emission measurement of nine NOx, then the current fuel schedule may be maintained.

Although in the above-mentioned example, the flow diagram 100 is applied to only one system output parameters, flow diagram 100 may be applied to more than one system output parameter (e.g., NOx emissions and temperature of the exhaust gas). For example, in some embodiments, to maintain the fuel schedule, all of the more than one system output parameters may be required to be within their respective threshold values.

In some embodiments, a priority scheme may be programmed into the controller 38, such that a majority (or any number) of the system output parameters may be within their respective threshold values for the fuel schedule to be maintained. For example, the controller 38 may receive sensor data indicative of system output parameters, such as the NOx emission output, the exhaust gas temperature, and the power output of the gas turbine 26. In an embodiment, if the exhaust gas temperature is not within its threshold values, but the NOx emission output and the power output are within their respective threshold values, the fuel schedule may be maintained due to the priority scheme.

However, if the system output parameters are not within the threshold values (e.g., or if the priority scheme mentioned above is not satisfied), the controller 38 may determine adjustments to the fuel schedule and/or the OBB valve 58 to achieve target system outputs (block 108). In some embodiments, the fuel schedule adjustments may be based on closed-loop feedback modification to the fuel schedules based on an open OBB valve 58, an open PBH valve 54, and on measurable turbine output parameters. That is, the fuel schedule modifications may be based on sensor closed-loop feedback.

For example, if the temperature of the exhaust gas of the gas turbine 26 (e.g., or a different system output parameter) is not within the threshold values, the controller 38 may determine that a fuel schedule parameter, such as the combustion firing temperature should increase or decrease to bring the temperature of the exhaust gas of the gas turbine 26 to within the threshold values (e.g., target values). Furthermore, the controller 38 may determine that the OBB valve 58 should also open (or close) a certain percentage to allow for more (or less) fluid flow along flow path 56 to achieve the target system parameters.

When the system outputs are not within thresholds, and after determining the modifications to the fuel schedule and/or the OBB valve, the fuel schedule is modified according to the determined fuel schedule modifications (block 110). For example, if the temperature of the exhaust gas of the gas turbine 26 is not within its threshold values and the controller 38 determines that the combustion firing temperature should increase to bring the exhaust gas temperature to within the threshold values, the controller 38 may accordingly modify the fuel schedule (block 110).

In some embodiments, modifying the fuel schedule may include sending a signal indicative of actuating the appropriate actuators 43 to modify the fuel schedule to attempt to bring the system output parameters (e.g., that are not within their respective target threshold values) to within their target threshold values. For example, the controller 38 may determine that it should increase the combustion firing temperature. In some embodiments, the controller 38 may accordingly open a fuel nozzle valve to increase the flow of the fuel and gas entering the fuel nozzle to increase pressure, and thereby increasing the combustion firing temperature.

After modifying the fuel scheduling according to the determined fuel schedule adjustments, the OBB valve 58 may be modified according to the determined modifications to the OBB valve 58 (block 112). For example, if the temperature of the exhaust gas of the gas turbine 26 is not within its threshold values and the controller 38 may determine that the OBB valve 58 should open to bring the exhaust gas temperature to within the threshold values, the controller 38 may accordingly modify the OBB valve (block 110).

In some embodiments, modifying the OBB valve may include sending a signal indicative of actuating the appropriate actuators 43 to modify the OBB valve to attempt to bring the system output parameters (e.g., that are not within their respective target threshold values) to within their target threshold values. For example, the controller 38 may determine that it should open the OBB valve 58 by 35%. In some embodiments, the controller 38 may accordingly open the OBB valve 58 by the determined amount (e.g., 35%) to increase the flow of fluid along flow path 56.

Although the example described above only deals with modifying one parameter of the fuel schedule, when one system output is not within its target threshold values, in some embodiments, one or more parameters of the fuel schedule may be modified when one or more system outputs are not within their respective target thresholds values. As mentioned above, the fuel schedule is modified according to the fuel schedule adjustments determined by the controller 38, which, in some embodiments, may be based on sensor feedback of the measurable outputs of the gas turbine 26.

Furthermore, in some embodiments, more than one of the system output parameters may not be within their respective target threshold values. As such, the controller 38 may determine modifications for the fuel schedule and/or the OBB valve 58 that may bring the one or more system output parameters to their respective target values. Although the above-mentioned examples discloses embodiments where the fuel schedule and OBB valve 58 are both modified to achieve target system output parameters, it should be noted that in certain embodiments, the controller may determine modifications and modify one of either the fuel scheduling or OBB valve 58.

After modifying the fuel scheduling according to the determined fuel schedule adjustments and/or OBB valve adjustments, the controller receives sensor data indicative of the system output parameters (block 102) to determine whether the system output parameters are within their respective thresholds. As such, flow diagram 100 shows an embodiment of a closed-loop control scheme for maintaining a fuel schedule (and OBB valve configuration) if the system output parameters (e.g., outputs of the gas turbine 26) are within their respective threshold values, and determining and modifying the fuel scheduling (and OBB valve) if the system output parameters are not within their respective threshold values, as discussed in detail above.

Technical effects of the present disclosure include systems and methods for modifying a valve (e.g., the OBB valve 58) of a power generation system. The modifications to the valve include opening the valve by a certain percent or closing the valve by a certain percent. Furthermore, modifying the valve may maintain measurements of ambient conditions near their corresponding threshold values. It should be noted that the power generation system may include sensor that may send data indicative of ambient conditions to a processor of a controller of the power generation system. After the processor receives the data of the ambient conditions, the processor may send a signal to cause the valve to open if one or more of the ambient conditions are below respective thresholds. Alternatively, the processor may send a signal to cause the valve to close if one or more of the ambient conditions are greater than respective thresholds.

This written description uses examples of the presently disclosed embodiments, including the best mode, and also to enable any person skilled in the art to practice the disclosed embodiments, including making and using any devices or systems and performing any incorporated methods. The patentable scope of the disclosed embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 24(f). However, for any claims containing elements designated in any other manner, it is intended that such elements are not to be interpreted under 35 U.S.C. 24(f).

The invention claimed is:

1. A power generation system comprising:
a filter;
a compressor fluidly coupled to the filter via an inlet of the compressor;
a first valve configured to fluidly couple a first fluid exiting the compressor to an inlet of the filter, wherein the inlet of the compressor is positioned downstream with respect to the filter, wherein the first fluid exits the compressor without mixing with exhaust from a turbine;
a second valve configured to fluidly couple the first fluid exiting the compressor to the inlet of the compressor and to an outlet of the filter;
a processor; and
memory storing instructions configured to cause the processor to:
receive a first set of sensor data indicative of one or more ambient conditions with respect to the power generation system;
determine whether one of the one or more ambient conditions is above a respective threshold; and
send a first signal to the first valve to open when the one of the one or more ambient conditions is below the respective threshold.

2. The power generation system of claim 1, wherein the respective threshold is associated with one or more frozen particles being generated within the filter.

3. The power generation system of claim 1, wherein the filter is configured to direct a fluid mixture toward the inlet of the compressor, wherein the fluid mixture comprises the first fluid and air.

4. The power generation system of claim 1, wherein the memory storing instructions are configured to cause the processor to send a second signal to the first valve to cause the first valve to close in response to the one of the one or more ambient conditions being above the respective threshold.

5. The power generation system of claim 1, wherein the first signal is configured to cause the first valve to open a portion of an aperture associated with the first valve.

6. The power generation system of claim 1, wherein the one or more ambient conditions comprise a temperature of air associated with the inlet of the compressor, a humidity of the air, a pressure of the air, or any combination thereof.

7. The power generation system of claim 1, wherein the filter is configured to receive air from outside the compressor.

8. A tangible, non-transitory, and computer-readable medium storing instructions thereon that are configured to be executed by one or more processors, wherein the instructions, when executed, are configured to cause the one or more processors to:
receive a first set of sensor data indicative of one or more ambient conditions with respect to a power generation system;
determine whether one of the one or more ambient conditions is above a respective threshold; and
send a first signal to a first valve to open when the one of the one or more ambient conditions is below the respective threshold, the first valve fluidly coupling a first fluid exiting a compressor to an inlet of a filter, the filter being positioned upstream with respect to an inlet of the compressor, wherein sending the first signal to open the first valve comprises causing the first fluid exiting the compressor to pass through the first valve without mixing with exhaust from a turbine.

9. The tangible, non-transitory, and computer readable medium of claim 8, wherein the respective threshold is associated with one or more frozen particles being generated within the filter, wherein the filter is configured to receive air from outside the compressor.

10. The tangible, non-transitory, and computer readable medium of claim 8, wherein the filter is configured to direct a fluid mixture toward the inlet of the compressor, wherein the fluid mixture comprises the first fluid and air.

11. The tangible, non-transitory, and computer readable medium of claim 8, wherein the instructions are configured to cause the one or more processors to send a second signal to the first valve to close in response to the one of the one or more ambient conditions being above the respective threshold.

12. The tangible, non-transitory, and computer readable medium of claim 8, wherein the first signal is configured to cause the first valve to open a portion of an aperture associated with the first valve.

13. The tangible, non-transitory, and computer readable medium of claim 8, wherein the one or more ambient conditions comprise a temperature of air associated with the inlet of the compressor, a humidity of the air, a pressure of the air, or any combination thereof.

14. A method, comprising:
receiving, via a processor, a first set of sensor data indicative of one or more ambient conditions with respect to a power generation system;
determining, via the processor, whether one of the one or more ambient conditions is above a respective threshold; and sending, via the processor, a first signal to a first valve to open when the one of the one or more ambient conditions is below the respective threshold, the first valve fluidly coupling a first fluid exiting a compressor to an inlet of a filter, the filter being positioned upstream with respect to an inlet of the compressor, and wherein the first fluid exits the compressor without mixing with exhaust from a turbine.

15. The method of claim 14, wherein determining whether the one of the one or more ambient conditions is above a respective threshold comprises determining whether the one of the one or more ambient conditions approaches the threshold.

16. The method of claim 14, comprising sending a second signal to the first valve to cause the first valve to close when the one of the one or more ambient conditions is above the respective threshold.

17. The method of claim 14, wherein the respective threshold is associated with one or more frozen particles being generated within a filter configured to receive air from outside the compressor.

\* \* \* \* \*